US010634821B2

(12) United States Patent
Yang

(10) Patent No.: US 10,634,821 B2
(45) Date of Patent: Apr. 28, 2020

(54) METHOD OF MANUFACTURING AN ANTI-GLARE COVER

(71) Applicant: Wuhan China Star Optoelectronics Technology Co., Ltd., Wuhan, Hubei (CN)

(72) Inventor: Yong Yang, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 231 days.

(21) Appl. No.: 15/578,141

(22) PCT Filed: Nov. 14, 2017

(86) PCT No.: PCT/CN2017/110904
§ 371 (c)(1),
(2) Date: Nov. 29, 2017

(87) PCT Pub. No.: WO2019/085019
PCT Pub. Date: May 9, 2019

(65) Prior Publication Data

US 2019/0219737 A1 Jul. 18, 2019

(30) Foreign Application Priority Data

Oct. 31, 2017 (CN) .......................... 2017 1 1043727

(51) Int. Cl.
*G02B 1/12* (2006.01)
*G02B 5/00* (2006.01)
(Continued)

(52) U.S. Cl.
CPC ................ *G02B 1/111* (2013.01); *C08F 2/48* (2013.01); *C08F 12/08* (2013.01); *C08F 20/16* (2013.01);
(Continued)

(58) Field of Classification Search
CPC .......... G02B 1/111; G02B 1/12; C08G 77/04; C08F 2/48
See application file for complete search history.

(56) References Cited

U.S. PATENT DOCUMENTS 8,993,222 B2 * 3/2015 Hatakeyama ......... G03F 7/2024 430/325
2007/0195419 A1 8/2007 Tsuda et al.
(Continued)

FOREIGN PATENT DOCUMENTS

| | | |
|---|---|---|
| CN | 101281261 A | 10/2008 |
| CN | 107153225 A | 9/2017 |
| CN | 107217262 A | 9/2017 |

OTHER PUBLICATIONS

Takei et al., "Advanced ultra-violet cross-link process and materials for global planarization," Journal of Micro/Nanolithography, MEMs and MOEMS, 7 (4), 043005, 2008, pp. 1-6. (Year: 2008).*

*Primary Examiner* — Kara B Boyle
(74) *Attorney, Agent, or Firm* — Hemisphere Law, PLLC; Zhigang Ma

(57) ABSTRACT

This invention is related to a method of manufacturing an anti-glare cover. The method includes preparing a crosslinking precursor solution, wherein the precursor solution is an organic solution with crosslinkable polymer monomer and crosslinking initiator; applying the crosslinking precursor solution on a cover to form a crosslinking precursor layer; pre-crosslinking and crosslinking the crosslinking precursor layer to form a mesh crosslinked layer; etching the cover with acid solution and the mesh crosslinked layer acting as a hard mask to form an anti-glare microstructure on the cover; and removing the mesh crosslinked layer.

18 Claims, 3 Drawing Sheets preparing a crosslinking precursor solution — S1
applying the crosslinking precursor solution on a cover 11 to form a crosslinking precursor layer 12 — S2
pre-crosslinking and crosslinking the crosslinking precursor later 12 to form a mesh crosslinked layer 13 on the cover 11 — S3
etching the cover 11 with the crosslinked layer 13 as hard mask to form an anti-glare microstructure 1a on the cover 11 — S4
removing the mask to obtain an anti-glare cover 1 — S5

(51) Int. Cl.

| | |
|---|---|
| ***G02B 1/111*** | (2015.01) |
| ***C08K 5/00*** | (2006.01) |
| ***C08F 2/48*** | (2006.01) |
| ***C08F 12/08*** | (2006.01) |
| ***C08G 65/00*** | (2006.01) |
| ***C08G 77/04*** | (2006.01) |
| ***C08F 20/16*** | (2006.01) |
| ***G02B 5/02*** | (2006.01) |
| *G02F 1/1337* | (2006.01) |

(52) U.S. Cl.

CPC ........... *C08G 65/002* (2013.01); *C08G 77/04* (2013.01); *C08K 5/0025* (2013.01); *G02B 1/12* (2013.01); *G02B 5/0268* (2013.01); *G02F 1/133788* (2013.01); *G02F 2001/133792* (2013.01); *G02F 2201/38* (2013.01); *G02F 2202/36* (2013.01)

(56) References Cited

U.S. PATENT DOCUMENTS

2012/0184103 A1* 7/2012 Ogihara .................. G03F 7/094
438/703
2013/0107370 A1* 5/2013 Lander .................... C03C 15/00
359/609

* cited by examiner

METHOD OF MANUFACTURING AN ANTI-GLARE COVER

RELATED APPLICATIONS

The present application is a National Phase of International Application Number PCT/CN2017/110904, filed Nov. 14, 2017, and claims the priority of China Application No. 201711043727.8, filed Oct. 31, 2017.

FIELD OF THE DISCLOSURE

This invention is related to the liquid crystal display, especially related to a method of manufacturing an anti-glare cover.

BACKGROUND

With the popularity of the liquid crystal display, the glaring issue in the bright environment causes inconvenience to the LCD users. Therefore, more and more LCD manufacturer adapts the anti-glare treatment on the cover to ease the glaring issue in the bright environment. As the resolution of the LCD is higher, the requirement of anti-glare treatment is more and more demanding. Preparing a cover with tiny microstructures, high sharpness and better anti-glare effects is the mainstream trend. In the conventional wet etching process to manufacture the anti-glare cover, the dimension of the microstructure on the cover is larger than 5 μm due to the concentration of the etching agent and the surface tension of solution. Therefore, the conventional wet etching process can not manufacture small enough microstructure to meet the high solution requirement. The lithography process cost too much for manufacturing such anti-glare covers. This impacts the popularity of the surface treatment of the cover.

Therefore, how to manufacture tiny microstructure on the anti-glare cover is one of the important issues in this industry.

SUMMARY

To solve the above-mentioned problem, this invention provides a method of manufacturing an anti-glare cover to manufacture the anti-glare cover with the dimension of the microstructure less than 5 μm.

To achieve such purpose, this invention provides a method of manufacturing an anti-glare surface treatment, which includes:

S1 preparing a crosslinking precursor solution, wherein the precursor solution is an organic solution with crosslinkable polymer monomer and crosslinking initiator;

S2 applying the crosslinking precursor solution on a cover to form a crosslinking precursor layer;

S3 pre-crosslinking and crosslinking the crosslinking precursor layer to form a mesh crosslinked layer;

S4 etching the cover with acid solution and the mesh crosslinked layer acting as a hard mask to form an anti-glare microstructure on the cover; and

S5 removing the mesh crosslinked layer.

Furthermore, the Step S3 further includes a step of soaking the cover with the mesh crosslinked layer in a swelling agent to swell the mesh crosslinked layer.

In one embodiment of present invention, the crosslinkable polymer monomer concentration of the crosslinking precursor solution is in a range of $10^{-4}$ mol/L~$10^{-2}$ mol/L.

In the other embodiment of present invention, the crosslinkable polymer monomer comprises ethylene oxide monomer, methyl methacrylate monomer, styrene monomer, and silicone monomer.

In the other embodiment of present invention, the crosslinking initiator comprises a photo initiator or a thermal initiator.

In the other embodiment of present invention, the crosslinking initiator concentration of the crosslinking precursor solution is in a range of $10^{-8}$ mol/L~$10^{-6}$ mol/L.

In the other embodiment of present invention, when the crosslinking initiator is a photo initiator, S3 further comprises:

radiating the crosslinking precursor layer with UV to induce pre-crosslinking reaction in the crosslinking precursor layer; and enhancing UV energy to radiate the crosslinking precursor layer to form the mesh crosslinked layer on the cover: and when the crosslinking initiator is a thermal initiator, S3 further comprises:

heating the crosslinking precursor layer to induce pre-crosslinking reaction in the crosslinking precursor layer; and ramping up the temperature to heat the crosslinking precursor layer to form the mesh crosslinked layer on the cover.

In the other embodiment of present invention, the method further comprises crosslinking the crosslinking precursor layer to form the mesh crosslinked layer on the cover till the degree of crosslinking is more than 90%.

In the other embodiment of present invention, the proton concentration of the acid solution in S4 is 5%~10%.

In the other embodiment of present invention, the S5 further comprise:

radiating the mesh crosslinked layer with UV or X-ray; and removing the mesh crosslinked layer from the cover with an anti-glare microstructure.

The present invention discloses a manufacturing method of anti-glare cover by preparing a mesh crosslinking layer on the cover; etching the cover with the mesh crosslinking layer acting as a hard mask, and removing the mesh crosslinking layer. It leverages the disorder and small hole dimension of the mash crosslinking layer to manufacture the anti-glare cover with small dimension microstructure. This anti-glare cover is good on anti-glare performance. Compared with the conventional manufacture processes, it solves the dimension limit of wet etching process and high cost of lithography process.

BRIEF DESCRIPTION OF THE DRAWINGS

In order to further understand the features and technical contents of the disclosure, the detailed descriptions and the accompanying drawings of the disclosure are provided as follows. However, the drawings are only for reference and illustration, and are not intended to limit the disclosure.

In the drawings.

DETAILED DESCRIPTION OF PREFERRED EMBODIMENTS

In order to further illustrate the technical means and their effects of the disclosure, the preferred embodiments of the disclosure will be described in detail with reference to accompanying drawings as follows.

This invention provides a manufacturing method of an anti-glare cover.

Figure 1:
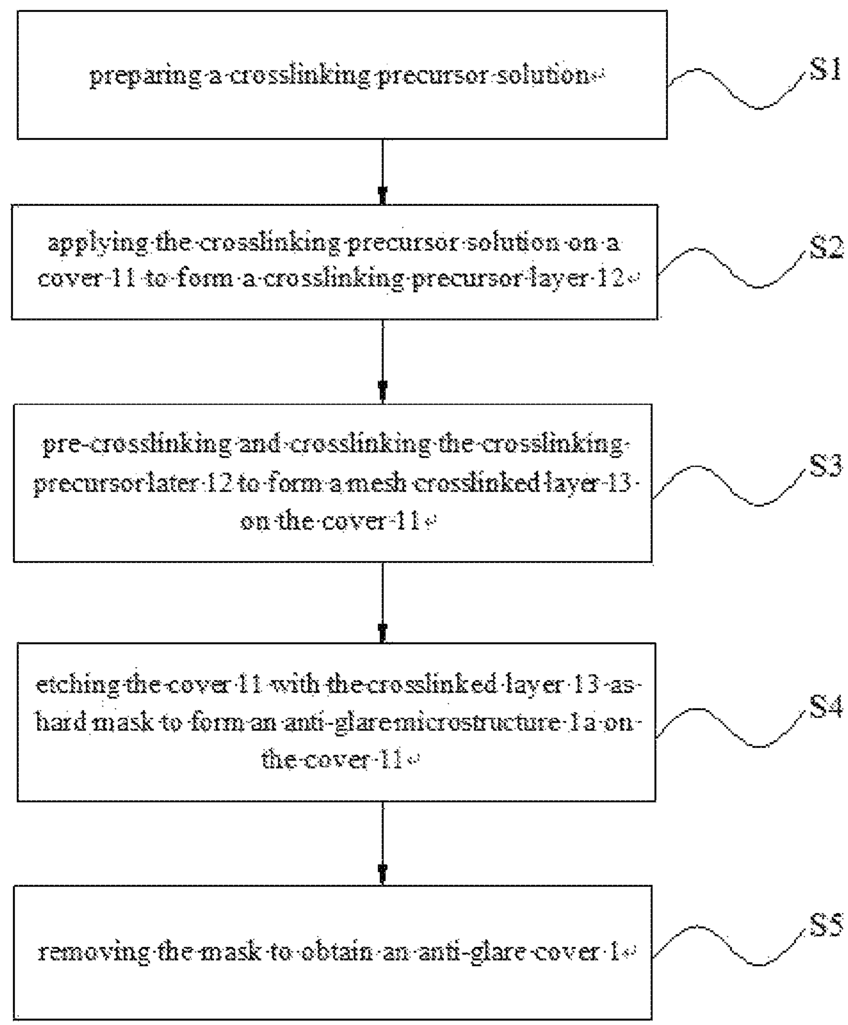
FIG. 1 is a flowchart of manufacturing an anti-glare cover.

With reference to FIG. 1, this embodiment of the method of manufacturing an anti-glare cover comprises the following steps.

Step S1 is preparing a crosslinking precursor solution. An array substrate 1 and a color filter substrate 2 disposed opposite to each other.

In the present embodiment, the precursor solution is an organic solution with crosslinkable polymer monomer and crosslinking initiator.

Generally, in the precursor solution, it contains crosslinkable polymer monomer concentration of the crosslinking precursor solution is in a range of $10^{-4}$ mol/L~$10^{-2}$ mol/L. The crosslinkable polymer monomer may be ethylene oxide monomer, methyl methacrylate monomer, styrene monomer, and silicone monomer. In the other word, the crosslinkable polymer monomer may be ethylene oxide monomer and its derives, methyl methacrylate monomer and its derives, styrene monomer and its derives, and silicone monomer and its derives for inducing crosslink reaction to form a mesh polymer with the present of crosslinking initiators.

Preferably, the crosslinking initiator can be a photo initiator or a thermal initiator.

In another embodiment, the crosslinking initiator in the precursor solution is microgram level. The crosslinking initiator concentration in the precursor solution is in a range of $10^{-8}$ mol/L~$10^{-6}$ mol/L.

Figure 2:
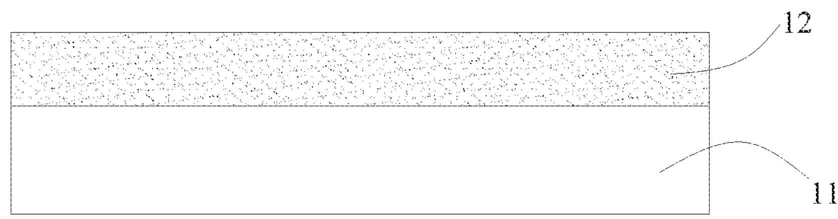
FIGS. 2-7 are the schematic drawings of the present invention.

With reference to FIG. 2, Step S2 is applying the crosslinking precursor solution on a cover 11 to form a crosslinking precursor layer 12 on the cover 11.

Figure 3:
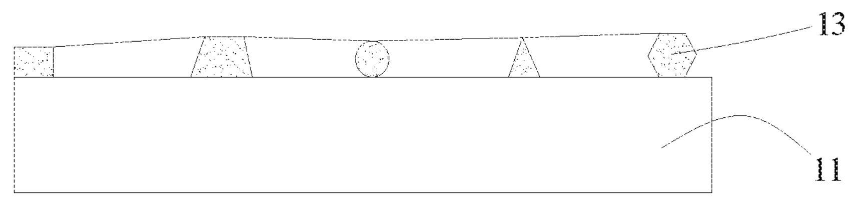

With reference to FIG. 3, Step S3 is pre-crosslinking and crosslinking the crosslinking precursor layer 12 to form a mesh crosslinked layer 13.

Because the mesh crosslinked layer 13 is acting as the hard mask in the subsequent etching process, the size and shape of holes in the mesh crosslinked layer 13 determine the shape and size of the anti-glare microstructure 1*a*. The morphology of the hard mask can be adjusted according the degree of crosslinking.

To be specific, when the crosslinking initiator is a photo initiator, Step S3 further comprises (a) radiating the crosslinking precursor layer 12 with UV to induce pre-crosslinking reaction in the crosslinking precursor layer 12; and (b) enhancing UV energy to radiate the crosslinking precursor layer 12 to form the mesh crosslinked layer 13 on the cover 11.

Generally, the crosslinking reaction will continue in the crosslinking precursor layer 12 to form the mesh crosslinked layer 13 on the cover 11 till the degree of crosslinking is more than 90%.

Figure 4:
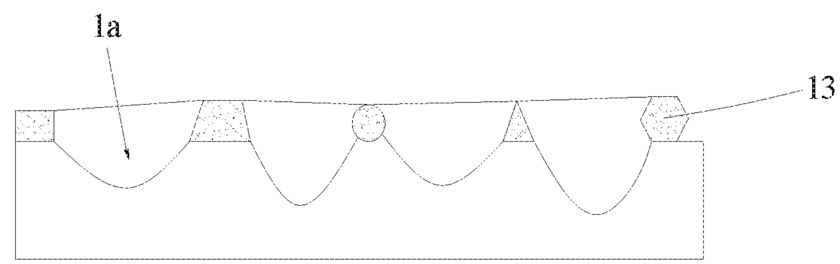

With reference to FIG. 4, Step S4 is etching the cover 11 with acid solution and the mesh crosslinked layer 13 acting as a hard mask to form an anti-glare microstructure 1*a* on the cover 11.

To be specific, the proton concentration of the acid solution in S4 is 5%~10%. Preferably, the acid solution is a mixture of HF, $H_2SO_4$ and $H_3PO_4$ in the ratio of 10:1:1.

Generally, the dimension of the anti-glare microstructure 1*a* can be controlled by adjusting the concentration of the acid solution and/or etching process.

Figure 5:
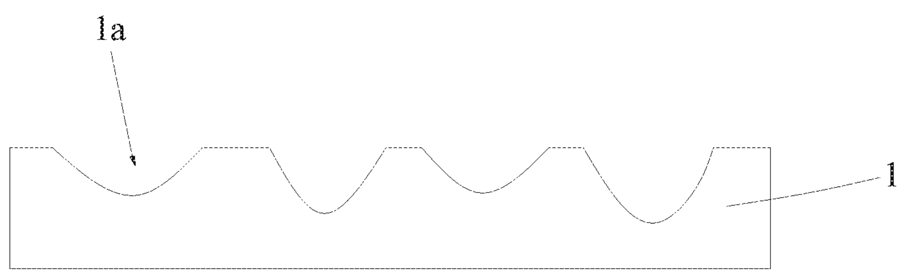

With reference to FIG. 5, the step S5 is removing the mesh crosslinked layer 13 to obtain the anti-glare cover 1.

In the present invention, the method of removing the mesh crosslinked layer 13 comprise: (1) radiating the mesh crosslinked layer 13 on the surface of the microstructure 1*a* with UV or X-ray to break the chemical bonds of the moleculars; and (2) removing the mesh crosslinked layer 13 from the cover with an anti-glare microstructure 1*a*.

Figure 6:
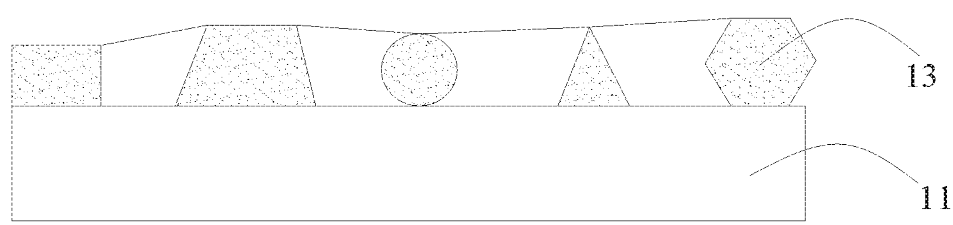
Figure 7:
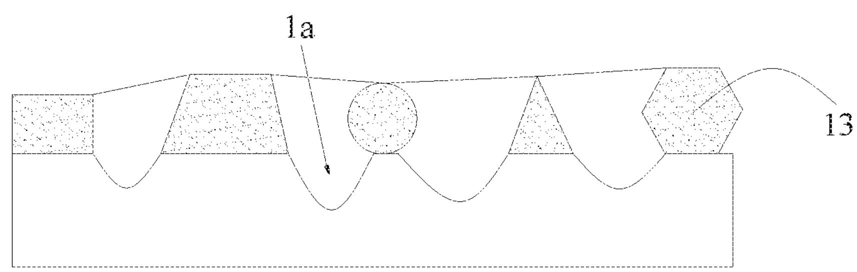

Accordingly, the size and shape of the microstructure 1*a* in the anti-glare cover 1 is determined by the holes in the mesh crosslinked layer 13. It's worthy to note that the concentration of crosslinkable polymer monomer should be higher when the dimension of the microstructure 1*a* is determined to be smaller and the concentration of crosslinkable polymer monomer should be lower when the dimension of the microstructure 1*a* is determined to be lager. Besides, the degree of crosslinking can be controlled via the pre-crosslinking prose. To be specific, it can be controlled by choosing UV with proper wavelength, radiation time, heating temperature and heating time. With reference to FIGS. 6-7, if the holes in the mesh crosslinked layer 13 are too larger after crosslinking, the mesh crosslinked layer 13 can be soak in the swelling agent to swell, and reduce the hole size of the mesh crosslinked layer 13. Therefore, the smaller dimension of the anti-glare microstructure 1*a* can be achieved.

In the foregoing, other corresponding modifications and variations may be made by those skilled in the art according to the technical solutions and technical ideas of the disclosure. All such modifications and variations should be included in the protection scope of the application.

What is claimed is:

1. A method of manufacturing an anti-glare cover, comprising:

S1 preparing a crosslinking precursor solution, wherein the precursor solution is an organic solution with crosslinkable monomer and crosslinking initiator;

S2 applying the crosslinking precursor solution on a cover to form a crosslinking precursor layer;

S3 pre-crosslinking and crosslinking the crosslinking precursor layer to form a mesh crosslinked layer;

S4 etching the cover with acid solution and the mesh crosslinked layer acting as a hard mask to form an anti-glare microstructure on the cover; and

S5 removing the mesh crosslinked layer.

2. The method according to claim 1, wherein S3 further comprises a step of soaking the cover with the mesh crosslinked layer in a swelling agent to swell the mesh crosslinked layer.

3. The method according to claim 1, wherein the crosslinkable monomer concentration of the crosslinking precursor solution is in a range of $10^{-4}$ mol/L~$10^{-2}$ mol/L.

4. The method according to claim 3, wherein the crosslinkable monomer is methyl methacrylate monomer.

5. The method according to claim 2, wherein the crosslinkable monomer concentration of the crosslinking precursor solution is in a range of $10^{-4}$ mol/L~$10^{-2}$ mol/L.

6. The method according to claim 5, wherein the crosslinkable monomer is methyl methacrylate monomer.

7. The method according to claim 1, wherein the crosslinking initiator comprises a photo initiator.

8. The method according to claim 7, wherein the crosslinking initiator concentration of the crosslinking precursor solution is in a range of $10^{-8}$ mol/L~$10^{-6}$ mol/L.

9. The method according to claim 7, wherein, when the crosslinking initiator is a photo initiator, S3 further comprises:

radiating the crosslinking precursor layer with UV to induce pre-crosslinking reaction in the crosslinking precursor layer; and enhancing UV energy to radiate the crosslinking precursor layer to form the mesh crosslinked layer on the cover;

wherein, when the crosslinking initiator is a thermal initiator, S3 further comprises:

heating the crosslinking precursor layer to induce pre-crosslinking reaction in the crosslinking precursor layer; and ramping up the temperature to heat the crosslinking precursor layer to form the mesh crosslinked layer on the cover.

10. The method according to claim 9, comprising: crosslinking the crosslinking precursor layer to form the mesh crosslinked layer on the cover till the degree of crosslinking is more than 90%.

11. The method according to claim 2, wherein the crosslinking initiator comprises a photo initiator.

12. The method according to claim 11, wherein the crosslinking initiator concentration of the crosslinking precursor solution is in a range of $10^{-8}$ mol/L~$10^{-6}$ mol/L.

13. The method according to claim 11, wherein, when the crosslinking initiator is a photo initiator, S3 further comprises:

radiating the crosslinking precursor layer with UV to induce pre-crosslinking reaction in the crosslinking precursor layer; and enhancing UV energy to radiate the crosslinking precursor layer to form the mesh crosslinked layer on the cover;

wherein, when the crosslinking initiator is a thermal initiator, S3 further comprises:

heating the crosslinking precursor layer to induce pre-crosslinking reaction in the crosslinking precursor layer; and ramping up the temperature to heat the crosslinking precursor layer to form the mesh crosslinked layer on the cover.

14. The method according to claim 13, comprising: crosslinking the crosslinking precursor layer to form the mesh crosslinked layer on the cover till the degree of crosslinking is more than 90%.

15. The method according to claim 1, wherein the proton concentration of the acid solution in S4 is 5%~10%.

16. The method according to claim 2, wherein the proton concentration of the acid solution in S4 is 5%~10%.

17. The method according to claim 1, wherein S5 further comprise:

radiating the mesh crosslinked layer with UV or X-ray; and removing the mesh crosslinked layer from the cover with an anti-glare microstructure.

18. The method according to claim 2, wherein S5 further comprise:

radiating the mesh crosslinked layer with UV or X-ray; and removing the mesh crosslinked layer from the cover with an anti-glare microstructure.

* * * * *